Sept. 8, 1959     S. M. JOSEPH     2,903,549
BARBECUE UNIT

Filed May 27, 1957     2 Sheets-Sheet 1

INVENTOR
STANLEY M. JOSEPH
BY
Mason & Graham
ATTORNEYS

Sept. 8, 1959  S. M. JOSEPH  2,903,549
BARBECUE UNIT
Filed May 27, 1957  2 Sheets-Sheet 2
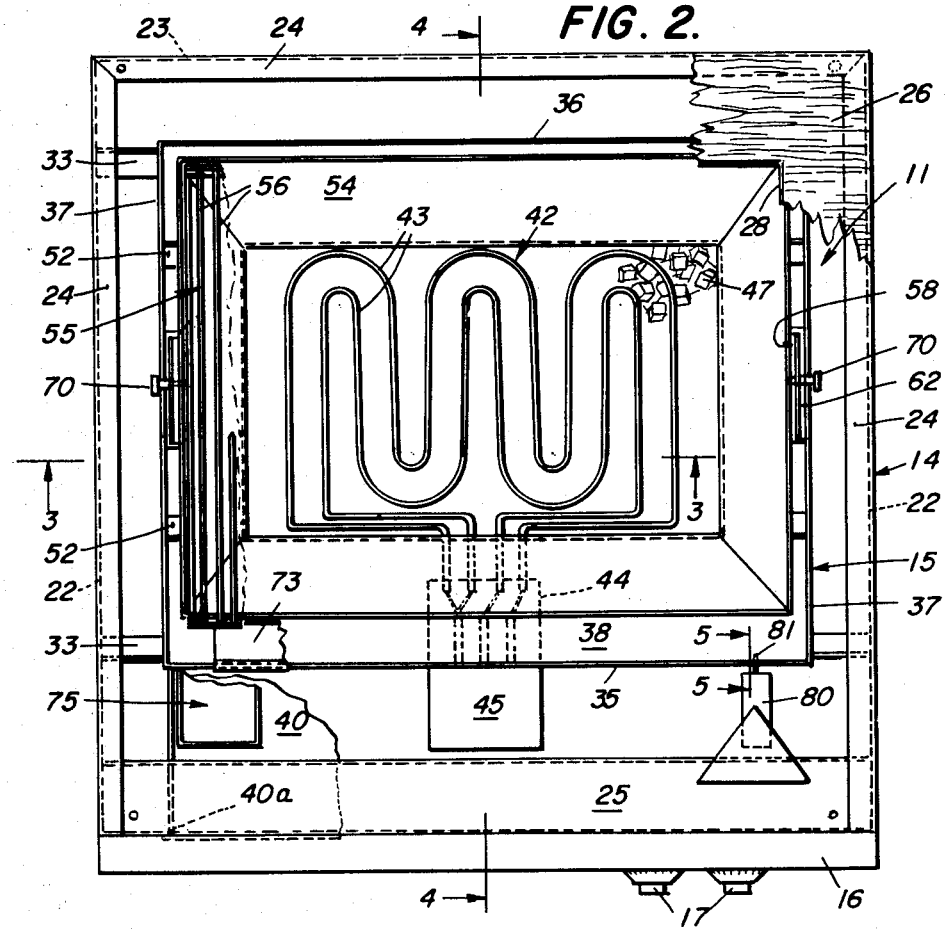
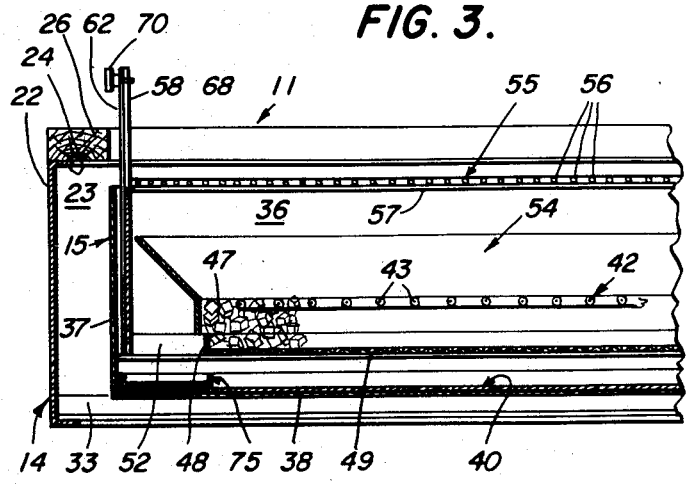
INVENTOR
STANLEY M. JOSEPH
BY
*Mason & Graham*
ATTORNEYS

United States Patent Office 2,903,549
Patented Sept. 8, 1959

2,903,549

BARBECUE UNIT

Stanley M. Joseph, Glendale, Calif., assignor to Stanthony Corporation, Los Angeles, Calif., a corporation of California Application May 27, 1957, Serial No. 661,956

9 Claims. (Cl. 219—35)

This invention has to do with cooking and particularly with devices for barbecuing food. By barbecuing is meant the process of broiling food from the under side largely with radiant heat.

Barbecuing of food has become very popular in recent years. However, there are several disadvantages attendant upon this. Because of the smoke and dirt entailed, it is usually carried on out of doors and is, therefore, dependant upon favorable weather conditions for success. While indoor barbecuing is gaining in popularity, this has heretofore required a costly masonry construction and ample available space therefor. Even conventional indoor barbecuing has the disadvantage of the dirt emanating from the use of charcoal and presents the difficulties of igniting and controlling the fuel.

It therefore is an object of my invention to provide a novel barbecue device which overcomes the various above-mentioned and other disadvantages of barbecues heretofore used.

Another object is to provide a compact, clean-operating device which is adaptable for use either as a portable device or as a permanently installed appliance.

It is a particular object to provide a novel barbecue unit which is specifically designed to be built into a kitchen counter or the like, being designed to fit a standard-sized kitchen cabinet. In this connection it is an object to provide a barbecue device which requires no masonry or fire insulation, having a double casing construction providing for the circulation of air between the casings and with the casings so spaced that the outer casing doesn't become hot. Further, in this connection it is an object to provide such a construction which enables the use of a wooden top, including a removable cover.

Another object is to provide a device which, when not in use, presents a flush, usable wood or other surface, at counter height, if installed in a kitchen or the like, and one in which all of the parts may be stored within the device when the same is not in use.

Still another object of the invention is to provide a novel barbecue unit utilizing an electrical heating element as the source of heat in conjunction with a bed of material which tends to act as a bed of coals or glowing charcoal.

A further object of the invention is to provide a construction wherein the top or cover, when in place, serves to open the circuit to the electric heating element, thereby insuring against operation of the heating element so long as the cover remains in place.

Another object is to provide a novel means for supporting the food in a manner such that the major portion of the grease dripping therefrom will be caught along one side of the device and a novel means for catching and removing the grease.

These and other objects will be apparent from the drawings. Referring to the drawings:

Fig. 2 is a plan view, partially broken away and with the cover removed, of the device of Fig. 1, but on a larger scale;

Fig. 3 is a fragmentary sectional elevation on line 3—3 of Fig. 2;

Figure 1:
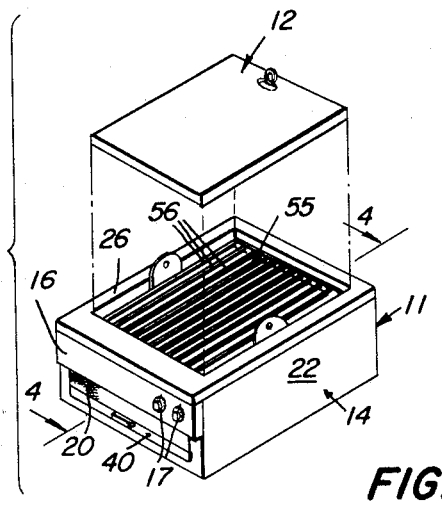
Fig. 1 is a perspective view, partially exploded, of a device embodying the invention.

More particularly describing the invention, in Fig. 1 the barbecue unit is shown as comprising the main portion 11 provided with a cover 12. The device has a casing means which includes an outer casing, designated 14, and an inner casing, designated 15. The outer casing is shown as generally rectangular and as provided with a forwardly projecting panel 16 upon which are mounted suitable controls 17. Beneath panel 16 is an opening 18 which is partially covered by a grill, wire mesh or the like 20 providing for circulation of air.

The outer casing 14 includes the side walls 22 and a rear wall 23 which have inwardly extending flanges 24, the front wall having an inwardly extending flanged portion 25. These flanges support a top frame 26 which is shown as made of wood but which could be of other material. Within the wood frame 26 is a metal frame 27 having an inwardly extending flange 28 forming a ledge upon which to support the cover 12 which could be of material to match or complement the top frame 26.

The inner casing 15 is supported upon a pair of angle iron crossbars 33, extending transversely of casing 14. Inner casing 15 has a front wall 35, a rear wall 36, and side walls 37. It also has a bottom wall 38 which rests directly upon the cross members 33. The front of the outer casing and front wall 35 of the inner casing have aligned or registering slots 40a and 40b which receive a grease drawer 40.

Above the drawer 40, and about midway of the height of the inner casing, I mount an electrical heating unit, designated 42. This includes the sinuously disposed elements 43 which are mounted in a terminal block 44 adapted for insertion into a suitable electrical receptacle 45 of conventional type. I preferably provide the type of heating unit which is used in the electric cooking stoves, namely, the type where the resistance element is enclosed in insulation within an outer tube or covering of special metal.

It is one of the features of my invention that I provide novel means for creating a condition which is comparable to having a bed of burning charcoal or coals. I accomplish this by supporting a bed of divided refractory material 47 just beneath the heating unit. The refractory material is supported in a shallow tray 48 having a perforate bottom 49 of wire mesh or other construction. The refractory material should form a bed up to the bottom or slightly above the bottom of the electric heating unit but should not cover the heating unit. I have found that cubes of firebrick are excellent for the purpose and should preferably be of the order of at least one-half inch on a side or of the order of one-eighth cubic inch, although this is not essential.

The receptacle or tray 48 rests upon crossbars 52 provided in the inner casing 15. Surrounding the heating unit and extending upwardly therefrom I provide a heat reflector and grease deflector, designated by 54. This rests on the upper edges of the crossbars 48 and may be removed.

Figures 4, 5, 6, 7:
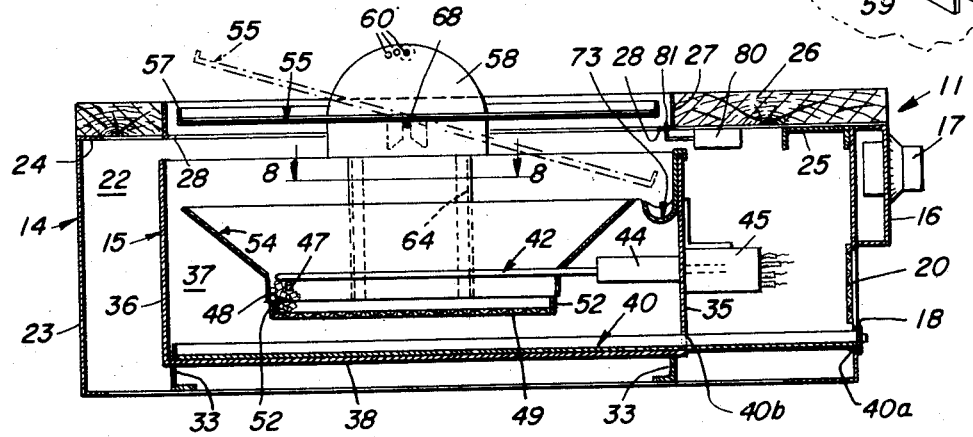
Fig. 4 is a sectional view on line 4—4 of Figs. 1 and 2.
Fig. 5 is a fragmentary sectional view on line 5—5 of Fig. 2, but on a larger scale.
Fig. 6 is a perspective view of a grill-supporting bracket.
Fig. 7 is a fragmentary perspective view of a portion of the grill frame.
Figure 8:
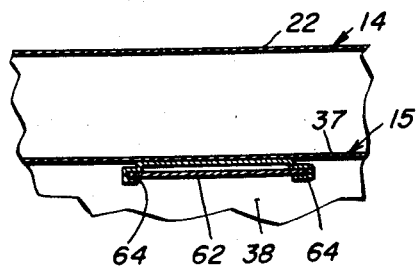
Fig. 8 is a fragmentary sectional view on line 8—8 of Fig. 4.

Another feature of the invention is the manner of supporting the grill, designated generally by numeral 55, upon which food is supported for cooking. The grill may consist of one or more grill elements 56 integral with or loosely inserted in a grill frame, designated 57. The latter is provided with a bracket 58 which has a recess 59 in its inner surface and a plurality of holes 60 near its upper edge. The brackets 58 are adapted to be supported on uprights or standards 62 which are removably mounted in slideways 64 provided on the side walls of the inner casing 15. Each member 62 has a shank portion 65 above which are shoulders 66 which limit travel of the device and serve as abutments for holding the member at the desired height. The head portion 67 is provided with a projecting pin 68 which is received in the recess 59 of the grill bracket 58. A spring-biased retractable pin 70 is provided for reception in one of the selected holes 60. With this arrangement the grill may be mounted either horizontally, as shown in full lines in Fig. 4, or inclined as shown by the broken lines in Fig. 4.

With the grill inclined, a major portion of the fat and grease will run down the rungs of the grill and drop off the lower edge. I therefore provide a grease trough, designated 73, which is hook-shaped in cross section and detachably fits over the upper edge of the front wall 35 of the inner casing. In order to catch the major portion of the grease which runs off the food when the grill is used in an inclined position, I may provide an auxiliary loose tray 75 within the grease drawer to receive the grease.

As a safety feature, I provide a switch 80 mounted in the casing 14 which has an upwardly projecting arm 81 in a position to be engaged and depressed by a cover member 12 when the same is in position. The cover member thereby serves to open the switch 80 which may be connected in the electrical circuit to the electrical heating unit thereby insuring that irrespective of the position of the controls 17, no current will flow through the heating element while the cover remains in place.

It should be noted that, when not in use, the grill and supporting structure therefor may be stored within the inner casing and all parts covered by the cover 12. It should also be noted that nearly all the parts of the device may be readily removed for cleaning or replacement.

Although I have shown and described a preferred form of my invention, I contemplate that various changes and modifications can be made without departing from the invention, the scope of which is indicated by the claims which follow.

I claim:

1. In a device for barbecuing food, a casing, an electric heating unit mounted within said casing, said unit having a plurality of elongated sections disposed in a common horizontal plane, a bed of divided refractory material beneath said sections of said heating unit and closely adjacent thereto, the upper side of said unit being exposed for the direct upward radiation of heat, a perforate receptacle mounted in said casing and supporting said refractory material, a food-supporting grill, grill-support means carried by said casing for tiltably supporting said grill, interengaging means on said grill support and said grill for adjustably locking said grill in either horizontal or inclined position, a grease-receiving trough detachably carried by said casing beneath the edge of said grill which is lowest when the same is tilted, and a removable grease pan in said casing beneath said trough and said heating unit.

2. A barbecue device, comprising an outer casing defining a top opening, an inner casing within and spaced inwardly of the walls of said outer casing, a perforate receptacle supported within said inner casing a substantial distance below the top thereof and adapted to hold a bed of refractory material, an electrical heating unit disposed substantially in a horizontal plane within said inner casing above said receptacle a substantial distance below the top of the inner casing, means carried by one of said casings for supporting a grill or the like above said heating unit, and means providing for circulation of air through and between said casings below the top thereof to the interior of the lower part of said inner casing, the said casings providing air circulator space therebetween in open communication with said top opening.

3. A device as set forth in claim 2 in which a combined heat reflector and grease deflector wall means is provided around and inclined outwardly and upwardly of said heating unit.

4. A device as set forth in claim 2 in which a combined heat reflector and grease deflector is provided around and upwardly of said heating unit, and in which said combined reflector and deflector, said heating unit, and said pan are removable through said top opening.

5. A barbecue construction, comprising an outer casing defining a top opening and having a removable cover for the opening, an inner casing within and spaced inwardly of said outer casing, a grease-receiving drawer mounted in said outer casing and extending through said inner casing forming a removable floor therefor, a heating element mounted in said inner casing above said drawer, means on one of said casings for supporting a grill in an inclined position above said heating element, a trough detachably mounted on said inner casing in position to receive grease dropping from the lowest edge of such a said inclined grill, and an auxiliary grease tray supported by said drawer for receiving grease from said trough.

6. In a simulated charcoal broiled electrical meat broiling device, the combination comprising an open-topped casing, an open-work meat-supporting grid carried by the top portion of said casing, a receptacle mounted in said casing below and in spaced relationship to said grid, a porous bed of heat refractory bodies in the form of separate discrete particles carried in said receptacle whereby to be positioned to receive grease drippings from meat being broiled on said grid, and an open-work electrical heating unit comprising a plurality of freely spaced heating elements providing unobstructed spaces therebetween to allow grease to drop freely onto said refractory particles, and supported in the top portion of but uncovered by said bed of refractory particles in spaced relationship to said grid whereby to radiate heat therefrom directly onto said grid and to heat said particles so that heat may be radiated from said particles through the unobstructed spaces in said unit onto said grid.

7. The device of claim 6 which additionally includes a wall circumscribing the space immediately above said receptacle and inclining upwardly and outwardly toward said grid.

8. The device of claim 6 wherein said grid is mounted for tilting movement relative to said electrical heating unit and said receptacle.

9. The device of claim 6 wherein said electrical heating unit is partially imbedded in said particles.

References Cited in the file of this patent

UNITED STATES PATENTS

| | | |
|---|---|---|
| 1,499,502 | Carmean | July 1, 1924 |
| 1,718,961 | Humphrey | July 2, 1929 |
| 1,910,700 | Lebau | May 23, 1933 |
| 2,058,172 | Meyers | Oct. 20, 1936 |
| 2,152,560 | Meyers | Mar. 28, 1939 |
| 2,221,870 | Kahn | Nov. 19, 1940 |
| 2,292,735 | Besocke | Aug. 11, 1942 |
| 2,510,856 | Bettencourt | June 6, 1950 |
| 2,556,365 | McKnight | June 12, 1951 |
| 2,576,632 | Meyers | Nov. 27, 1951 |
| 2,581,343 | Ames | Jan. 8, 1952 |
| 2,626,559 | Rau | Jan. 27, 1953 |
| 2,720,827 | Del Francia | Oct. 18, 1955 |
| 2,790,434 | Del Francia | Apr. 30, 1957 |
| 2,826,669 | Schmertz | Mar. 11, 1958 |